June 22, 1965 J. J. FITZPATRICK ETAL 3,190,961

TELEPHONE ANSWERING AND RECORDING SYSTEM

Filed Dec. 21, 1961 2 Sheets-Sheet 1

INVENTORS J. J. FITZPATRICK
A. ZAROUNI

BY R.C. Winter
ATTORNEY

TELEPHONE ANSWERING AND RECORDING SYSTEM

Filed Dec. 21, 1961 2 Sheets-Sheet 2

INVENTORS J. J. FITZPATRICK
A. ZAROUNI
BY
R. C. Winter
ATTORNEY

United States Patent Office 3,190,961
Patented June 22, 1965

3,190,961
TELEPHONE ANSWERING AND RECORDING SYSTEM

James J. Fitzpatrick, Summit, N.J., and Alfred Zarouni, Brooklyn, N.Y., assignors to Bell Telephone Laboratories, Incorporated, New York, N.Y., a corporation of New York Filed Dec. 21, 1961, Ser. No. 161,016
15 Claims. (Cl. 179—6)

Figures 1A, 2:
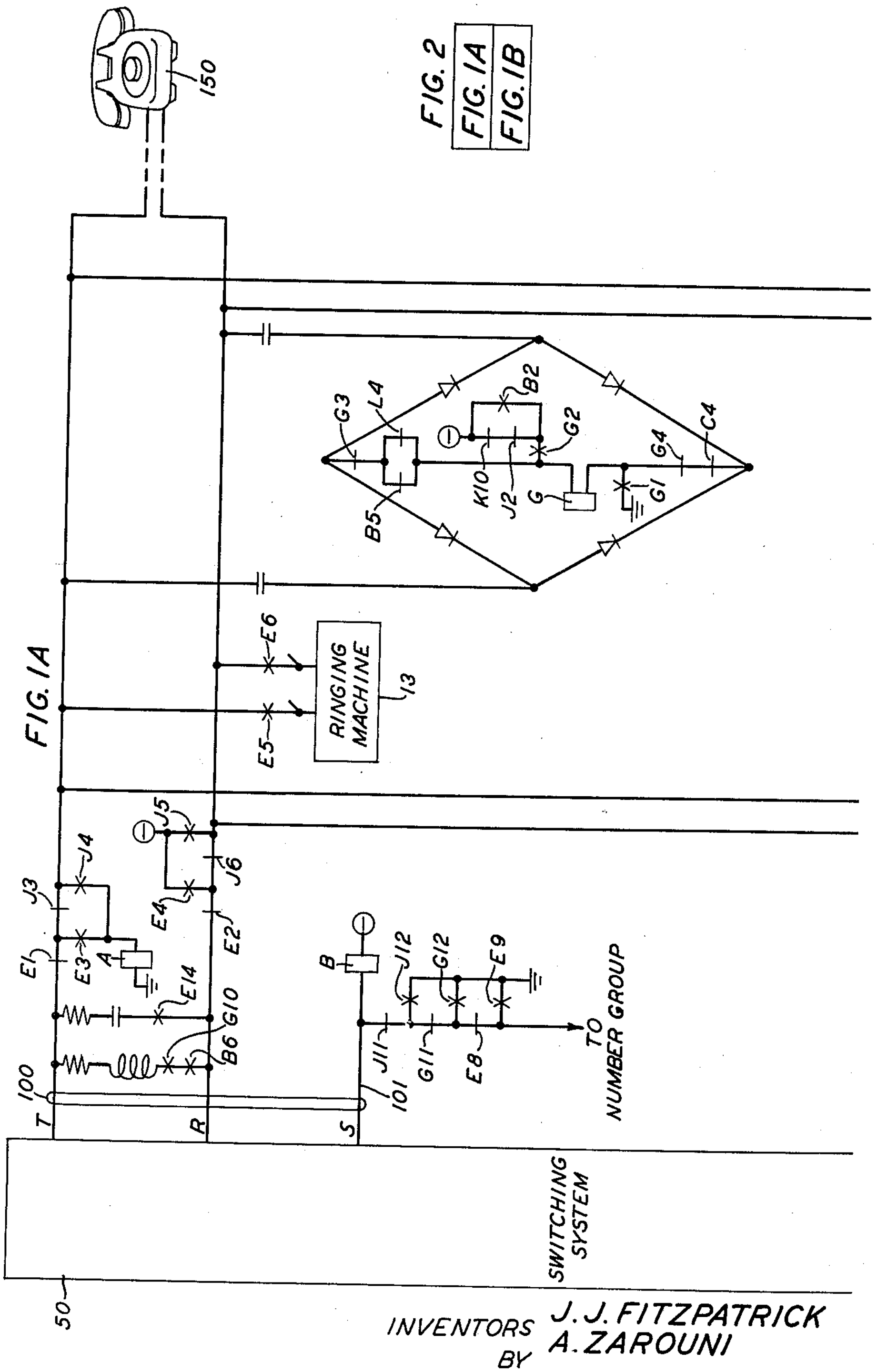

This invention relates to telephone switching systems and more particularly to the recording of messages directed to an unavailable called party and the automatic delivery of the recorded messages to the called party when available.

Various answering and recording arrangements are available in the telephone art. Such arrangements, however, fail to provide for the situation in which a party is busy on a call when another call is directed to his line. In this event, of course, the calling party will receive busy tone and abandon the call.

Accordingly, it is an object of this invention to provide improved answering and recording facilities in a telephone system.

It is another object of this invention to permit the employment of telephone answering and recording facilities in a manner which will avoid abandonment of any calls to lines having the facilities.

More particularly, it is an object of this invention to automatically answer calls to busy lines or to idle, unanswered lines, to record messages directed to such unavailable called lines, and to deliver the recorded messages to the called lines when they become available.

It is a further object of this invention to provide such service without major modification of the equipment in the central office to which the called lines are connected.

These and other objects of this invention are attained in accordance with one illustrative embodiment thereof wherein each line to which this service is extended is provided with a second line appearance connected to the announcement and recording facilities. If the called line is busy, the central office equipment will transfer the calling line to these facilities where a message may be recorded following an appropriate announcement which informs the calling line that the called party is not presently available. As soon as the called line becomes idle, it will be rung automatically, and upon answer the recorded messages will be delivered.

Also should the called party fail to answer an incoming call after a prescribed interval, the recording facilities are brought into use, and the messages so recorded are delivered when the called party returns.

In the event that there is an incoming call while the called party is receiving recorded messages, the calling party will receive the conventional busy tone. This is also the case when the called line is unavailable and the recording capacity has been reached.

It is a feature of this invention that announcing and recording equipment be associated with a second terminal appearance of a line receiving message-recording service.

It is another feature of this invention that facilities be provided for automatically connecting a calling line to the recording facilities through the second terminal appearance of the called, special service line when the called line is busy.

It is a further feature of this invention that facilities be provided for alerting a special service line, as it becomes idle, to the availability of recorded messages and for automatically delivering the messages upon answer.

It is still another feature of this invention that facilities be provided for automatically connecting a calling line to the recording facilities through the first terminal appearance of the called, special service line when the called line is idle but fails to answer in a predetermined time.

It is still a further feature of this invention that busy tone be provided to a calling line when the called, special service line is receiving recorded messages.

It is also a feature of this invention that busy tone be provided to a calling line when the called, special service line is busy and the recording facilities have reached their capacity.

It is also another feature of this invention that a calling line not be switched from an idle, called, special service line to the recording facilities if such facilities have reached their capacity.

Figure 1B:
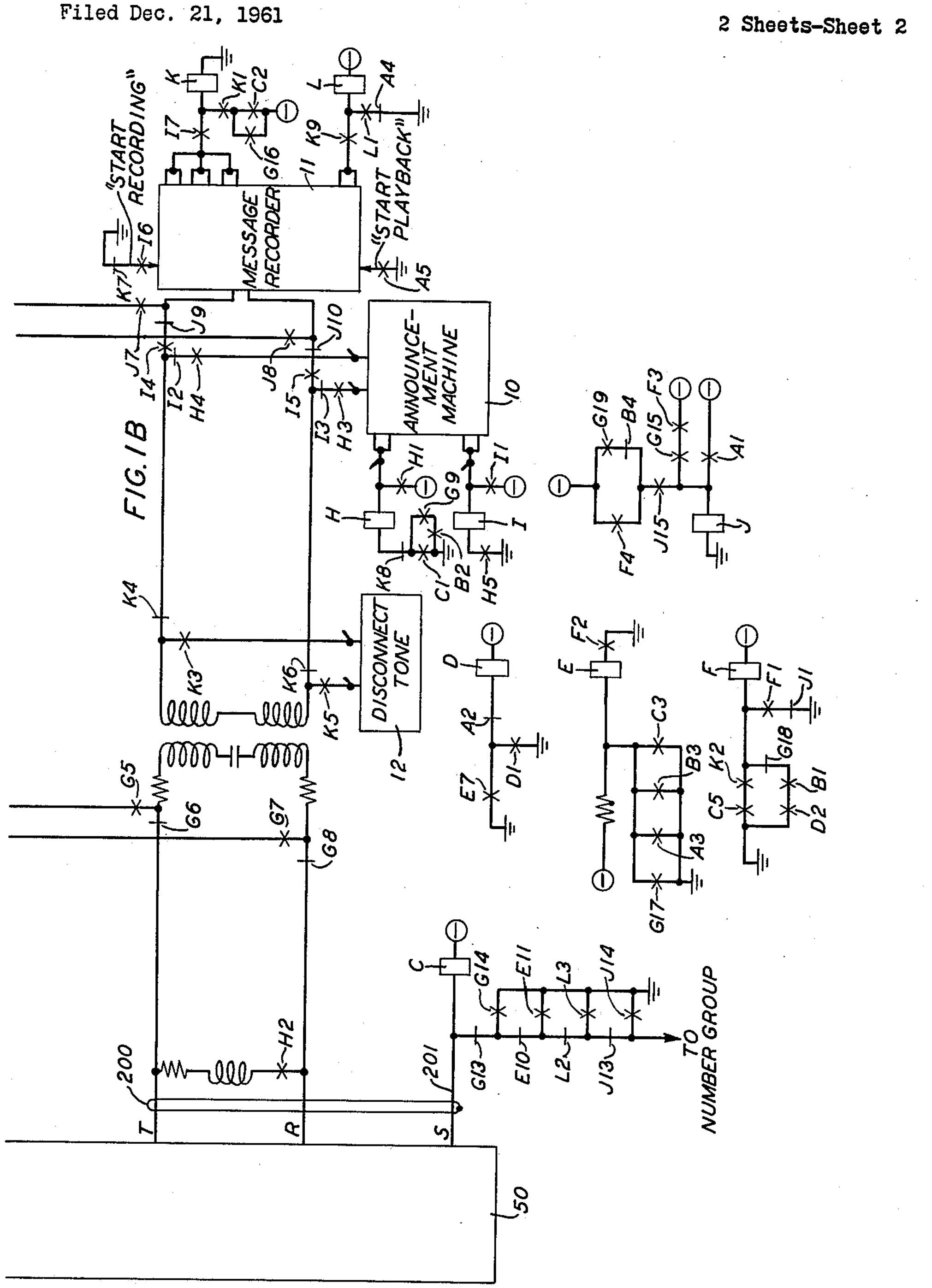

A complete understanding of this invention and of these and various other features thereof may be gained from consideration of the following detailed description and the accompanying drawings, FIGS. 1A and 1B of which are a schematic representation of one specific illustrative embodiment of this invention. The relationship of FIGURE 1A to FIGURE 1B is shown in FIGURE 2.

Turning now to the drawings, FIGS. 1A and 1B thereof show the circuit details for implementation of the callback service in accordance with the invention.

The "detached contact" type of notation is employed in the drawing in which contacts on relays in their normal, unoperated condition are designated by an "x" if open (make contacts) and by a vertical bar if closed (break contacts). This type of notation is described in an article "An Improved Detached Contact Type of Circuit Drawing" by F. T. Meyer, A.I.E.E. Transactions, September 1955, vol. 74, pages 505–513.

The depicted circuitry for this illustrative embodiment is arranged for cooperation with a No. 5 crossbar switching system such as disclosed, for example, in A. J. Busch Patent 2,585,904, issued February 19, 1952. The terminal appearances or line contacts are similar to the line terminations of the subscriber's line described in the reference Busch patent. Also the regular line appearance is provided with line and cut-off relays of the type disclosed in the reference Busch patent. The second line terminal appearance does not require line and cut-off relays since only incoming calls will have access to this appearance for message recording purposes. The subscriber receiving the callback service only has access to this appearance for purposes of receiving recorded messages, and in this instance connections are made directly to the recording apparatus.

Line 100 represents the regular line terminals or line appearance of the subscriber's line, while line 200 represents the terminals or appearance of the announcing and recording apparatus associated with the second line appearance.

Calls originating from subscriber stations, such as 150, receiving the callback service are transmitted over the line conductors to the telephone switching system 50. All of the relay contacts associated with the line appearance 100 remain normal at this time and thus do not interfere with the subscriber's use of the line circuit to effect an outgoing call. Consequently, the switching system 50 will respond to the request for service by the station 150 in the usual manner without affecting any of the equipment illustrated in the drawing.

If a call is directed to the station 150 and the regular line appearance 100 is idle, the connection will be established in the usual manner with the hold magnet and B relay connected to the sleeve lead 101 being activated to indicate a busy condition on the line 100. The switching system 50 in turn will cause the station 150 to be rung and upon answer by the called party and later termination of the call, the circuits of the reference Busch patent as well as the station 150 and the line appearance 100 connecting the station 150 with the switching system 150, will operate in their usual manner.

*Message recording—busy called line*

If a call is directed to the station 150 during the time that this station is busy, due either to having been called or having originated a call, the regular line appearance 100 will register a busy condition in the switching system 50. The switching system 50 in this instance is arranged to hunt over a group of terminals designated the number group, including the regular line appearance 100 and the second line appearance 200. Thus the switching system will test and find the busy condition on the first line appearance 100, will move to the second line appearance 200 and, finding this appearance idle, will set up a connection to the terminals in the usual manner. The capacitance and resistance in the line transformer of the appearance 200 will simulate the ringing circuit in the station 150 so that the line continuity test performed by the switching system 50 will be completed and the connection set up to the terminals 200.

Consider now the operation involved in recording a message from a calling party who is unable to reach the called party 150 due to the line circuit 100 registering a busy condition. The switching system 50 has completed the testing of the line 100, noted the presence of the busy condition and switched to the second line appearance 200. Finding the second appearance idle, the switching system 50 now establishes the connection of the calling party to this appearance. In establishing the connection, the switching system 50 places ground on the sleeve lead 201, thus operating the C relay, which remains operated as long as this appearance continues in the busy state.

The announcement machine 10 is a continuously cycled machine, as known in the art, which is prepared to deliver an announcement informing a calling party as to the nature of the service. At the start of each cycle the announcement machine 10 provides battery which serves, with relay C operated, to operate the H relay through break contacts K8 and operated make contacts C1 to ground. The H relay in turn locks itself through make contacts H1 to battery and remains operated for the duration of the call. Operation of the H relay trips the ringing inducion supplied to the calling party by virtue of the low impedance path established across the tip and ring leads of the line 200 when contacts H2 are operated. Simultaneously the calling party is connected to the announcement machine 10 by closure of contacts H3 and H4. After allowing a short interval for the ringing signal to be disconnected, the announcement machine 10 will inform the calling party in a suitable fashion that the called party is unavailable and that if he desires he may record a message upon receipt of a "start record" tone, which message will be delivered to the called party as soon as he becomes available. The announcement machine 10 also contains the prerecorded "start record" tone which directly follows the announcement on the tip and ring leads of the line 200.

During the "start record" tone the announcement machine provides another battery output to operate the I relay through operated contacts H5 to ground. Make contacts I1 lock the I relay to battery for the duration of the call. Transfer contacts I2 and I3 operate at this time to disconnect the calling party from the announcement machine 10, and contacts I4 and I5 operate to connect the calling party to the message recorder 11. Also operation of make contacts I6 in the "start recording" lead serve to ground a circuit which initiates the recording operation in the message recorder 11.

The calling party is allowed a reasonable time in which to record his message, after which the message recorder 11 provides battery to operate the K relay through operated contacts I7. The K relay locks to itself through contacts K1 and operated make contacts C2 to battery, in which state it remains for the remainder of the call. Operation of the K relay results in operation of the F relay from ground through operated make contacts C5 and K2 to battery on the F relay. The F relay locks itself through make contacts F1 and break contacts J1. The F relay serves to remember until playback occurs that a message has been recorded. Transfer contacts K3, K4, K5 and K6 connect a "disconnect" tone source 12 to the tip and ring leads of the appearance 200. This tone indicates to the calling party that he has reached the end of the allowed recording interval and should disconnect. Operation of the break contacts K7 in the "start recording" lead of the recorder 11 serves to halt the recording operation. Finally, operation of break contacts K8 opens the holding path for the H relay which, upon restoring, removes the low direct-current impedance path across the tip and ring leads at contacts H2 so as to once again simulate an on-hook condition at the line appearance 200.

The "disconnect" tone from source 12 will continue to be applied across the tip and ring until the sleeve lead 201 loses its ground due to disconnect by the calling party or time-out of the trunk, which in turn releases the C relay. With the C relay restored, the K relay will also restore. Similarly, with the H relay restored, the I relay will also be restored. Thus with the exception of the F relay, all circuits are restored to normal in the line appearance 200 in preparation for receipt of additional messages or playback of the recorded messages to the called station 150.

In the event that the capacity of the recorder has been reached, no further messages may be recorded until the called party at station 150 has received the recorded messages. This blocking action is acomplished by the provision of ground by the recorder 11 to operate the L relay through make contacts K9 while the K relay is operated. The L relay then remains operated by locking through make contacts L1 and break contacts A4 to ground until playback has occurred. Transfer contacts L2 and L3 serve to ground the extension of the sleeve lead 201 to the number group. This is accomplished before the sleeve lead 201 at the line appearance 200 has lost the ground extended from the switching system 50 after recording the last message. In this fashion the circuit is protected against the receipt of incoming calls when its recording capacity has been reached, since subsequent incoming calls, finding the first line appearance 100 busy, will also find the second line appearance 200 busy.

*Playback*

When one or more messages have been recorded in the message recorder 11, the F relay will be operated and will remain operated until the playback attempt has been completed. The first attempt at playback occurs when the station 150 becomes idle and the second line appearance 200 is also idle. In this event relays A, B and C are in their normal state so that with the F relay operated, relay E will operate from ground through contacts F2 to battery, the short circuit to ground being open at the unoperated make contacts A3, B3, C3 and G17. Operation of the E relay opens the line loop 100 toward the switching system 50 at break contacts E1 and E2 in the tip and ring leads, respectively. The ringing machine 13 is connected to the line appearance 100 through make contacts E5 and E6 and relay D operates through make contacts E7. The E relay also provides ground on both of the sleeve leads 101 and 201 extended to the number group at contacts E8, E9, E10 and E11 in order to prevent receipt of any incoming calls during the playback operation.

Transfer contacts E3 and E4 in line appearance 100 serve to connect the A relay across the tip and ring leads of the line appearance 100. When the station 150 goes off-hook in response to the ringing, a path is completed over the tip and ring leads to operate the A relay from ground through the A relay, operated make contacts E3, the break contacts J3, the tip leads, the station 150, the ring lead, normal break contacts J6, and operated make contacts E4 to battery.

Operation of the A relay causes the E relay to release by establishing a short circuit to ground through make contacts A3. With the E relay restored, the ringing machine 13 is disconnected from the line 100. Also relay D is released upon operation of break contacts A2.

Make contacts A1 operate to complete a path for the operation of the J relay. Transfer contacts J11, J12, J13 and J14 operate to continue the number group busy condition on both sleeves 101 and 201 after the E relay has released. Also contacts J3, J4, J5 and J6 operate to maintain the A relay in its operated state.

With the J relay operated, the station 150 is connected directly to the message recorder 11 through contacts J7 and J8. A make contact A5 on the "start playback" lead connects ground to a circuit which initiates the playback operation in the message recorder 11 at this time in order to start the playback operation, and the party at station 150 now receives all of the messages which have been left for him while the station 150 was unavailable. When the station 150 goes back on-hook, the A relay is released, thus concluding the playback operation and permitting the erasure of all recorded messages.

*Playback attempt—no answer*

In the event that the station 150 does not answer the ringing on the playback attempt after a predetermined time interval, the time delay relay G will operate on ringing current rectified by the diode bridge. The G relay locks through operated make contacts G1 and G2 and normal break contacts J2 and K10. It releases the E relay by establishing a short circuit to ground through operated make contacts G17. Release of make contacts E5 and E6 discontinues ringing. The G relay operates the J relay through make contacts G15 and operated make contacts F3. The J relay locks itself through make contacts J15 and either make contacts G19 and break contacts B4 or make contacts F4 to battery. Operation of the J relay will cause the F relay to release by operation of break contacts J1. The halting of ringing and operation of break contacts J2 allow the G relay to release. The J relay is subsequently released upon restoration of both make contacts F4 and G19, and the playback attempt is thereupon cancelled.

In the process of halting the playback attempt, the D relay remains operated through its contacts D1 and A2 inasmuch as the A relay was not operated in this sequence of events. Thus when the party later returns to the station 150, as indicated by the operation of the B relay on the sleeve lead 101 of the regular line appearance 100, the F relay will operate over a path from ground through operated make contacts D2, B1 and normal break contacts G18. This prepares the circuit as before for a new playback attempt.

*Message recording—line unanswered*

An incoming call, finding the first line appearance 100 idle, will operate the B relay to signify a busy condition on the line 100 and will begin ringing the station 150. Rather than have the call abandoned if the called party is not available, provision may be made to switch the call automatically to the recording equipment after a predetermined time interval by utilizing the time delay relay G.

The G relay is connected across the tip and ring leads of the line 100 through capacitors, a diode bridge and break contacts C4, G4, B5, L4 and G3. Transfer to the recording equipment can only be effected when the second line appearance 200 is also idle. Otherwise operation of busy relay C would open the circuit of the G relay at contacts C4. Also the break contacts L4 and B5 prevent operation of the G relay when the message recorder 11 has reached its capacity. In each of these cases ringing would be continued in the usual manner until the calling party disconnects.

The G relay operates from rectified ringing current after a predetermined time interval and locks through operated make contacts G1, G2 and B2. It disconnects itself from across the tip and ring leads at contacts G3 and G4 and trips the ringing by operating make contacts G10 which, in conjunction with operated make contacts B6, places a low impedance short across the same tip and ring leads. Operation of the G relay connects the line appearance 100 to the announcement machine 10 and to the message recorder 11 through make contacts G5 and G7 and simultaneously disconnects the second line appearance 200 from the announcement machine 10 at break contacts G6 and G8.

The J relay also will be operated momentarily through make contacts G15 and F3 if messages were previously stored in the message recorder 11, such that the F relay was operated. The J relay locks to itself via operated make contacts J15 and F4. As indicated in the description of the playback operation, the F relay is released by operation of break contacts J1, whereupon the J relay is again released by restoration of make contacts F3 and F4. Restoration of the F relay at this time will assure that the subset 150 will not again be run for playback subsequent to recording of the incoming message when the B relay restores. When the J relay operating momentarily at this time, the message recorder 11 will be connected to the line appearance 100 at contacts J7 and J8. However, inasmuch as the I relay on the announcement machine 10 has not yet operated, the message recorder 11 will not begin recording at this time since the make contacts I6 are normal.

Both line appearances 100 and 200 appear busy at this time by grounding the number group extensions of sleeve leads 101 and 201 at contacts G11 through G14. The calling party is now connected through the tip and ring leads of the line appearance 100, operated make contacts G5 and G7, the line transformer, and break contacts I2 and I3 to the make contacts H3 and H4 on the announcement machine 10. Operated make contacts G9 and B2 in the operate path of the H relay cause the H relay to operate at the next battery signal provided by the announcement machine 10 at the start of each repetitive announcement. Thus contacts H3 and H4 are operated, and the calling party receives the recorded announcement indicating to him that the called party is unavailable and his message may be recorded.

The subsequent operations involving the message recorder 11 and the disconnect tone 12 correspond to these operations performed while recording messages received over the second line appearance 200, as described hereinbefore. Upon completion of the recording operation, the K relay is operated from battery in the recorder 11 and locks to battery through operated make contacts G16, serving to restore the H relay and subsequently the I relay. However, the disconnect tone will continue to be applied across the tip and ring leads of line appearance 100 until the B relay is released, permitting release of the G relay at contacts B2. The K relay releases upon restoration of make contacts G16. The line appearance 100 is returned to an idle condition by removal of the disconnect tone upon restoration of make contacts K3 and K5 to normal.

*Special circumstances*

There are two possible situations which might arise in regard to the instant circuit during playback of the recorded messages. First of all, assume that line appearance 100 is busy, with the subset 150 actually engaged in a call. Consider further that the second line appearance 200 is also busy recording a message for playback when the first line appearance 100 becomes idle. It is possible that at the instant the first appearance 100 becomes idle, releasing relay B, a new, incoming call will test the number group appearance of the sleeve 101 and finding it idle, will attempt to set up a connection to the subset 150 through the line appearance 100. Before this connection can be completed, the second line appearance 200 becomes idle, thus releasing relay C and subsequently operating relay E, which in turn connects the subset 150 to the ringing machine 13 as part of the playback attempt. At this point the switching system 50 completes the connection to the first line appearance 100 and grounds the sleeve 101 so as to operate relay B. It would now appear that the subset 150 is connected to the calling party and the message recorder simultaneously. However, when the switching system 50 succeeds in grounding the sleeve of the line appearance 100, thereby operating the B relay, the E relay is shunted to ground through operated contacts B3 and is thereby released. This action in turn opens the operate path of the slow to operate A relay which affords the final control of the playback operation when the subset 150 goes off-hook. Thus the playback attempt is postponed and the calling party is connected to the called party. The next playback attempt will be made as soon as the line appearances 100 and 200 become idle.

The second situation presents itself when the first line appearance 100 is busy, such that relay B is operated and the second line appearance 200 is busy; viz., relays C and F are operated. The second line appearance 200 completes the recording of a message and is restored to the idle condition, releasing the C relay. At this point a new calling party tests the number group appearance of sleeve 101 and finding it busy, moves to the number group appearance of sleeve 201, which now tests idle. The switching system 50 then proceeds to set up the connection to the recording equipment. Thereupon the first line appearance 100 goes idle, releasing the B relay and operating the E relay to ring the subset 150. The A relay in turn is connected across the tip and ring leads of appearance 100, serving to control the start of the playback operation which will begin upon subset 150 going off-hook.

At this point the switching system 50 completes the connection to line appearance 200, grounding the sleeve lead 201 and operating the C relay. Such operation in turn releases the E relay, thereby discontinuing the playback attempt by breaking the operate path of the slow to operate A relay. If the subset 150 had responded to the playback ringing at this time, a dial tone would be received. Meanwhile the calling party is connected directly to the recording equipment on the line appearance 200 and proceeds to leave his message. The next playback attempt will be initiated as soon as both line appearances 100 and 200 become idle.

It is to be understood that the above-described arrangements are illustrative of the application of the principles of the invention. Numerous other arrangements may be devised by those skilled in the art without departing from the spirit and scope of the invention. For example, the ring detecting circuitry may include a simple timing mechanism which will operate after a predetermined interval of ringing to discontinue the playback attempt or to transfer an attempted call from the line appearance 100 to the recording equipment. Similarly the equipment may be simplified to include only the recording of messages when the called line is busy on another call, thus simplifying the per line equipment necessary to provide the recording service. It is also apparent that the recording equipment may be arranged to be common to a number of lines receiving this service in the same fashion that the announcement machine 10, disconnect tone 12 and ringing machine 13 are indicated to be common equipment in the drawing.

What is claimed is:

1. In a telephone system, a line, two terminal appearances individual to said line, recording means, means responsive to the selection of one of said terminal appearances when the other terminal appearance is busy for activating said recording means to record a message, and means activated upon said other terminal becoming idle for delivering the recorded message to said line.

2. In a switching system having facilities for interconnecting pairs of lines, recording apparatus, means for diverting to said recording apparatus a request for connection of a first line to a busy second line, means for alerting the second line to the availability of recorded messages upon restoration of the second line to the idle condition, and means operative upon answer by the second line for delivering the recorded messages to the second line.

3. In combination, a telephone line having a plurality of terminal appearances, means for extending a connection from a first one of said line terminal appearances to said line, announcing and recording equipment, means for extending a connection from a second one of said line terminal appearances to said announcing and recording equipment for announcing to a calling line that said telephone line is presently unable to receive the incoming call and for recording a message, and means for connecting said telephone line to said recording equipment when said telephone line becomes idle.

4. In a telephone system, a line having first and second terminal appearances, recording means associated with said second terminal appearance, means for extending a connection to said second terminal appearance to record a message when said line is busy, and means for establishing a connection of said line to the recording means when said line becomes idle.

5. In a telephone system, a line, two terminal appearances individual to said line, recording apparatus associated with said terminal appearances, means responsive to the selection of one of said terminal appearances by a calling line when said line is unavailable for connecting said selected terminal appearance to said recording apparatus, and means automatically activated upon completion of the recording operation and upon said line becoming available for connecting said recording apparatus to said line.

6. In a telephone system, a calling line, a called line, recording apparatus, means for indicating that said called line is not available for connection to the calling line, first means responsive to said indicating means for connecting said calling line to said apparatus to announce the unavailability of the called line and to record a message, and second means operative upon said called line becoming available for connecting said apparatus to said called line to deliver the recorded message.

7. In a telephone system, the combination according to claim 6 and further comprising first and second terminal appearances, means for connecting said called line directly to said first terminal appearance, means for connecting said recording apparatus directly to said second terminal appearance, and means for connecting said recording apparatus directly to said called line.

8. In a telephone system, the combination according to claim 7 and further comprising means responsive to the operation of said indicating means for connecting said first line appearance to said recording apparatus.

9. In a telephone system, the combination according to claim 7 wherein said indicating means comprises means for indicating a busy first terminal appearance.

10. In a telephone system, the combination according to claim 9 wherein said first terminal appearance connecting means comprises means responsive to the operation of said indicating means for seizing said second terminal appearance.

11. In a telephone system, a line having first and second terminal appearances, recording means associated with said second terminal appearance, means for extending a connection to said second terminal appearance to record a message when said line is busy, means for establishing a connection of said line to said recording means when said line becomes idle, and means for overriding said connection establishing means in order to connect said recording means to said second terminal appearance in response to a new request for the use of said recording means.

12. In a telephone system, a line having first and second terminal appearances, recording means associated with said second terminal appearance, means for extending a connection to said second terminal appearance to record a message when said line is busy, means for establishing a connection of said line to said recording means when said line becomes idle, means for extending a connection to said first terminal appearance when said line is idle, and means for connecting said first terminal appearance to said recording means upon failure of the called party to answer in a predetermined time.

13. In a telephone system, a called line, recording apparatus, means for indicating that said called line is not available for connection to a calling line, means responsive to said indicating means for connecting a calling line to said apparatus to announce the unavailability of said called line and to record a message, and means for connecting said apparatus to said called line to deliver the recorded message, said indicating means comprising means activated after a predetermined interval of ringing for registering an unsuccessful attempt to reach said called line.

14. In a telephone system, the combination according to claim 13 wherein said means for connecting the called line to the recording apparatus comprises means controlled by said recording apparatus for ringing said called line automatically upon completion of the message recording operation and for connecting said recording apparatus to said called line upon answer by the called line.

15. In a telephone system, the combination according to claim 14 and further comprising means responsive to the failure of the called line to respond to the automatic ringing in a predetermined time for disconnecting ringing from the called line and preparing the recording apparatus for connection to the called line when it is subsequently busied by the called party.

References Cited by the Examiner

UNITED STATES PATENTS

| | | | |
|---|---|---|---|
| 1,727,137 | 9/29 | Steklik | 179—27 |
| 2,909,607 | 10/59 | Nilsson et al. | 179—18 X |
| 2,998,489 | 8/61 | Riesz | 179—6 |

FOREIGN PATENTS

| | | |
|---|---|---|
| 426,865 | 4/35 | Great Britain. |

BERNARD KONICK, *Acting Primary Examiner.*